United States Patent
Lasee et al.

(10) Patent No.: US 9,541,120 B2
(45) Date of Patent: Jan. 10, 2017

(54) PRIZE DISPENSER AND PRIZE DISPENSING HOOK ASSEMBLY THEREFOR

(71) Applicant: Bay Tek Games, Inc., Pulaski, WI (US)

(72) Inventors: Randy Lasee, Sobeiski, WI (US); Mark Johnson, Green Bay, WI (US); Gina Krahn, Green Bay, WI (US)

(73) Assignee: Bay Tek Games, Inc., Pulaski, WI (US)

( * ) Notice: Subject to any disclaimer, the term of this patent is extended or adjusted under 35 U.S.C. 154(b) by 319 days.

(21) Appl. No.: 13/770,636

(22) Filed: Feb. 19, 2013

(65) Prior Publication Data

US 2014/0231447 A1    Aug. 21, 2014

(51) Int. Cl.
*F16B 45/02* (2006.01)
*G07F 9/10* (2006.01)
*G07F 11/64* (2006.01)
*G07F 17/32* (2006.01)
*G07F 11/42* (2006.01)

(52) U.S. Cl.
CPC ............. *F16B 45/02* (2013.01); *G07F 9/10* (2013.01); *G07F 11/64* (2013.01); *G07F 11/42* (2013.01); *G07F 17/3297* (2013.01)

(58) Field of Classification Search
USPC ......... 221/69, 119, 120, 121, 123, 133, 224, 221/225, 277
See application file for complete search history.

(56) References Cited

U.S. PATENT DOCUMENTS

| | | | | |
|---|---|---|---|---|
| 2,454,857 A | * | 11/1948 | Bish | A47K 10/12 24/507 |
| 3,219,234 A | * | 11/1965 | Wichman | B42F 15/0029 221/129 |
| 3,814,284 A | * | 6/1974 | Flubacker | G07F 11/64 221/301 |
| 5,113,758 A | | 5/1992 | Chou | |
| 5,816,918 A | | 10/1998 | Kelly et al. | |
| 5,948,362 A | * | 9/1999 | Steinbrenner | B01L 9/543 206/486 |
| 5,967,341 A | * | 10/1999 | Werner | A47F 5/0884 211/71.01 |
| 5,996,457 A | | 12/1999 | Wingeron, Jr. | |
| 6,015,344 A | | 1/2000 | Kelly et al. | |
| 6,089,386 A | * | 7/2000 | Shiau | A47F 5/0884 211/119 |

(Continued)

*Primary Examiner* — Gene Crawford
*Assistant Examiner* — Kelvin L Randall, Jr.
(74) *Attorney, Agent, or Firm* — Andrus Intellectual Property Law, LLP (57) ABSTRACT

A prize dispensing hook assembly is provided for retaining a prize suspended from a base of a prize dispenser and releasing the prize therefrom at a predetermined release location. The hook assembly includes a hook structure mounted on the base for movement relative thereto. The hook structure is engageable with the prize in a prize retaining position and is disengagable from the prize in a prize releasing position corresponding to the predetermined release location. The biasing arrangement is continuously engaged with both the base and the hook structure, and provides a biasing force continuously urging an open of the hook structure into direct engagement with the base. An actuator arrangement is mounted within the prize dispenser and is provided with a movable release element which is selectively engageable with the hook structure to move the hook structure to the prize releasing position.

15 Claims, 5 Drawing Sheets

(56) References Cited

U.S. PATENT DOCUMENTS

| | | | |
|---|---|---|---|
| 6,139,017 A * | 10/2000 | Kawamura | G07F 17/3253 |
| | | | 273/138.1 |
| 6,340,094 B1 | 1/2002 | Kawamura | |
| 6,439,423 B1 * | 8/2002 | Suzuki | G07F 11/58 |
| | | | 221/81 |
| 6,652,380 B1 | 11/2003 | Luciano | |
| 6,679,775 B1 | 1/2004 | Luciano et al. | |
| 6,843,720 B2 | 1/2005 | Luciano et al. | |
| 6,923,721 B2 | 8/2005 | Luciano et al. | |
| 6,971,543 B2 | 12/2005 | Halliburton et al. | |
| 7,077,747 B1 | 7/2006 | Luciano, Jr. | |
| 7,314,324 B2 | 1/2008 | Luciano, Jr. et al. | |
| 7,506,800 B2 | 3/2009 | Corso et al. | |
| 7,942,290 B2 | 5/2011 | Halliburton et al. | |
| 7,951,003 B2 | 5/2011 | Russell et al. | |
| 8,960,411 B2 * | 2/2015 | Tsai et al. | B65G 47/36 |
| | | | 198/465.4 |
| 2006/0194630 A1 | 8/2006 | Pellegrini | |
| 2011/0183745 A1 | 7/2011 | Gagner et al. | |

\* cited by examiner

PRIZE DISPENSER AND PRIZE DISPENSING HOOK ASSEMBLY THEREFOR

BACKGROUND OF THE INVENTION

The present disclosure relates generally to prize dispensers and, more particularly, pertains to a prize dispensing hook assembly for retaining a prize suspended from within the prize dispenser, and releasing the prize therefrom at a predetermined release location in the prize dispenser.

Redemption games, such as offered in arcade game centers, are games of skill that reward a player proportionately to their score in the game, typically in the form of redemption tickets. A player can exchange the redemption tickets for a wide variety of prizes available at a prize display and dispensing area, such as a prize booth, within the arcade game center.

One problem with previously known redemption games is that maintaining a redemption system can be burdensome to the operator of the arcade game center. For example, a prize booth must display all the prizes an operator wishes to make available, and be staffed by one or more employees who must manually count the redemption tickets being exchanged by a player and then manually dispense the prize or prizes selected. Requiring further maintenance is the effort needed to maintain adequate inventory control over the prizes displayed in the booth so players have access to a full supply of prizes desired at the time of ticket redemption.

Other redemption systems are known that are embodied in automated display and dispensing devices which are designed to retain and release prizes using rotating carousels with various hook arrangements. While such automated display and dispensing devices are an advisement over the previously used manual display and dispensing methods, these devices operate with less than desirable retaining and releasing functions for the prizes. Accordingly, there remains a need for further improvement of an automated prize dispenser and prize dispensing hook assembly which provides a more positive, efficient and reliable prize vending process.

SUMMARY OF THE INVENTION

The present disclosure relates to a prize dispensing hook assembly for retaining a prize suspended from a base of a prize dispenser and releasing the prize therefrom at a predetermined release location. The hook assembly includes a hook structure mounted to the base for movement relative thereto. The hook structure is engageable With the prize in a prize retaining position, and is disengagable from the prize in a prize releasing position corresponding to the predetermined release location. A biasing arrangement is continuously engaged with both the base and the hook stricture, and provides a biasing force for continuously urging an open end of the hook structure into direct engagement with the base.

The open end of the hook structure is movable into and out of direct engagement with the base in the prize retaining and prize releasing positions, respectively. The hook structure includes an upper portion extending above the base, and a lower portion extending beneath the base and provided with the open end. The upper portion of the hook structure is adapted to be selectively engaged by a release element for overcoming the force of the biasing arrangement and moving the hook structure to the prize releasing position. The lower portion of the hook structure is movable through a guide device mounted on the base. In the exemplary embodiment, the biasing arrangement is defined by a spring.

The present disclosure further relates to a prize dispensing hook assembly for retaining a prize suspended from a base of a prize dispenser and releasing the prize therefrom at a predetermined release location. A hook structure is mounted to the base for movement relative thereto. The hook structure is engageable with the prize at a prize retaining position, and disengagable from the prize at a prize releasing position corresponding to the predetermined release location. An actuator arrangement is mounted within the prize dispenser, and is provided with a movable release element which is selectively engageable with the hook structure to move the hook structure to the prize releasing position.

The hook structure is held in the prize retaining position by a biasing arrangement connected between and continuously engaged with the base and the hook structure. The biasing arrangement is preferably a coil spring having one end attached to the base, and another end attached to the hook structure with the coil spring providing a biasing force on the hook structure. The hook structure is movably mounted within a slot arrangement formed in the base. The hook structure includes an upper portion extending above the base, and a lower port on having an open end extending beneath the base. The upper portion of the hook structure is engageable with the release element of the actuator arrangement. The open end of the hook structure is normally held closed and engaged directly against the base in the prize retaining position. The lower portion of the hook structure is formed with a recess having a wall for supporting the prize in the prize retaining position. The release element is movable directly against the hook structure to overcome the biasing force of the spring on the hook stricture so that the prize is disengaged from the hook structure, after which the spring returns the hook structure to the prize retaining position. The lower portion of the hook structure is movable through a guide device mounted on the base. The actuator arrangement is positioned at the predetermined release position, and includes an actuator and a translating device operably coupled to the release element. The actuator arrangement is spaced above the base. The release element is selectively rotatable over the base into engagement with the hook structure at the predetermined release location.

The present disclosure further relates to a prize dispenser provided with a hook assembly for retaining a prize suspended therefrom and releasing the prize therefrom at a predetermined release location. The prize dispenser includes a cabinet, and a base mounted within the cabinet. A hook structure is mounted on the base for movement relative thereto. The hook structure is engageable with the prize at a prize retaining position, and disengagable from the prize at a prize releasing position corresponding to the predetermined release location. A biasing arrangement is continuously engaged with the base and the hook structure, and provides a biasing force for continuously urging an open end of the hook structure into direct engagement with the base. An actuator arrangement is mounted on the cabinet, and is provided with a movable release element which is selectively engageable with the hook structure to overcome the force of the biasing arrangement and move the open end of the hook structure away from the base to the prize releasing position such that the prize is disengaged from the hook structure. A discharge passage is provided in the cabinet in alignment with the predetermined release location for receiving the prize disengaged from the hook structure. A discharge port is provided in the cabinet in communication with the discharge passage for accessing the prize disengaged from the hook structure.

The cabinet is provided with a scanning deice for reading receipts redeemable for prizes in the prize structure, a printing device for printing a receipt based on an input to the seaming device, and a touch screen interface associated With the scanning device for enabling selection of the prizes to be dispensed from the cabinet. The base is rotatably mounted in the cabinet, and the biasing arrangement is a coil spring having one end attached to the base and another end attached to the hook structure. The actuator assembly is mounted on a support bracket attached to an interior wall of the cabinet at the predetermined release location.

BRIEF DESCRIPTION OF THE DRAWINGS

The best mode of carrying out the disclosure is described herein below with reference to the following drawing figures.

DETAILED DESCRIPTION OF THE INVENTION

Figure 1:
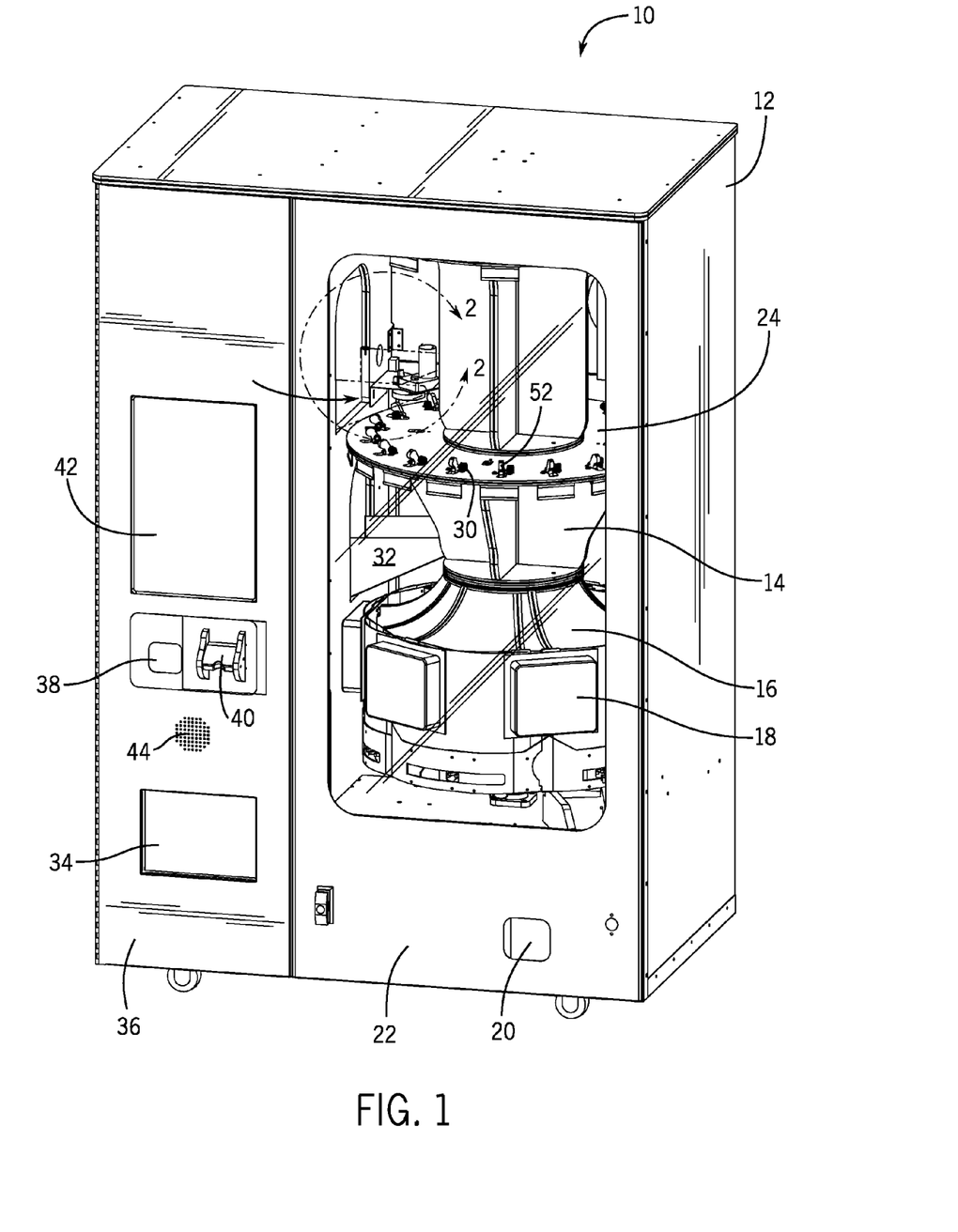
FIG. 1 is perspective view of a prize dispenser having a prize dispensing hook assembly in accordance with the present disclosure.
Figure 2:
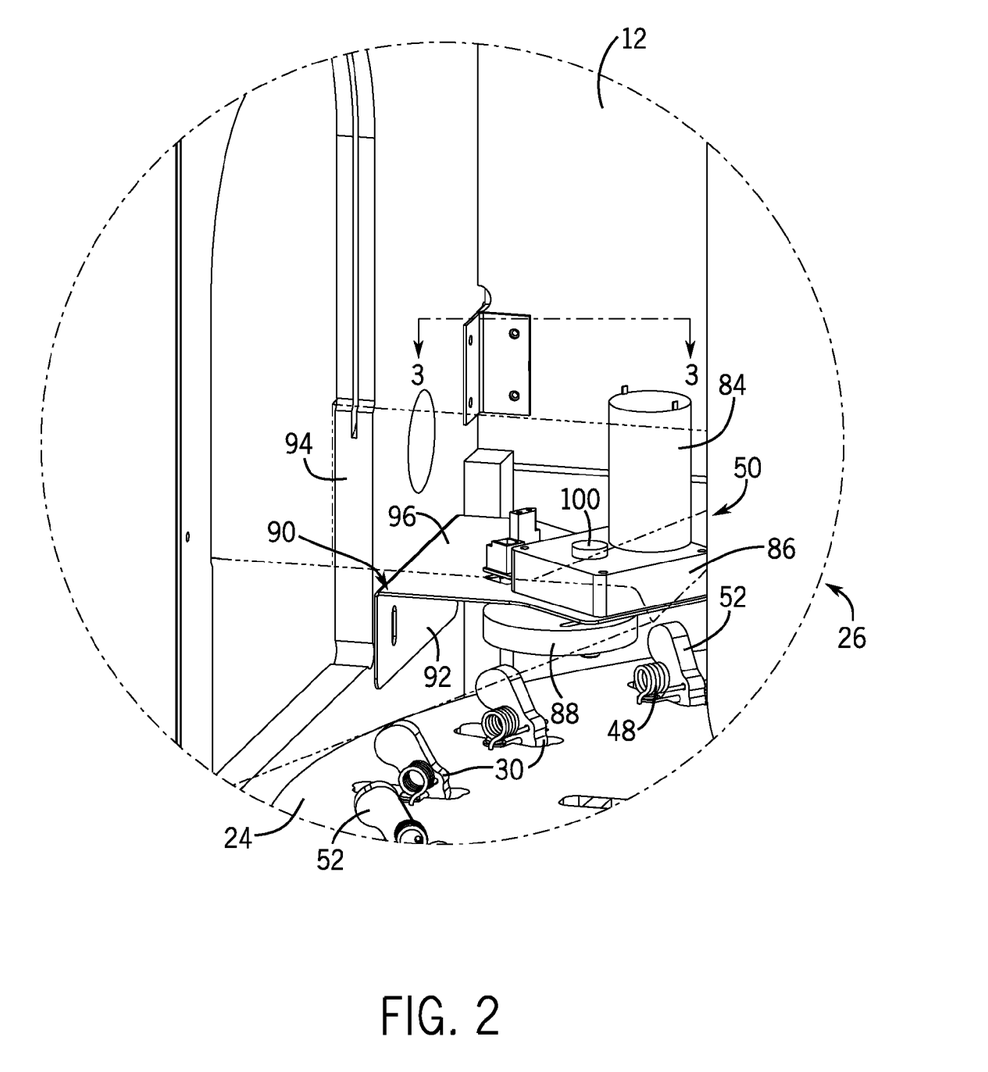
FIG. 2 is an enlarged detail view taken on me 2-2 of FIG. 1.

Referring now to the drawings. FIG. 1 illustrates a prize dispenser 10 for storing, displaying and supplying a variety of prizes in response to input provided by a user.

The prize dispenser 10 includes a box-like cabinet 12 having a first section provided with a rotating carousel 14. A lower portion of the carousel 14 has a series of bins 16 for holding a number of smaller prizes that are identified by various small prize indicators 18. The smaller prizes in the bins 16 are designed to be dispensed to a small prize discharge port 20 formed through a front wall 22 of the first section of the cabinet 12. An upper portion of the carousel 14 has at least one rotatable circular base 24 associated with a prize dispensing hook assembly 26 for suspending a number of larger prizes 28 (FIGS. 4 and 5) therefrom. The carousel 14 and the base 24 rotate about a vertical axis passing through the center of the base 24. The base 24 is provided adjacent an outer periphery thereof with a slot arrangement defined by at least one and preferably a series of equally spaced apart slots 30 formed completely through the thickness of the base 24. As will be detailed hereafter, the larger prizes 28 are designed to be released and dropped down from the hook assembly 26 at a predetermined release location into a discharge chute 32 defining a discharge passage. The discharge chute 32 is communicated with a large prize discharge port 34 provided in a front wall 36 of a second section of the cabinet 12.

The front wall 36 is also provided with a scanning device 38 for reading one or more printed receipts from different arcade games which receipts are redeemable for various prizes from the dispenser 10. The front wall 36 also includes a printing device 40 for printing a receipt indicating the number of tickets in a user's possession. The receipt is printed either after redeeming the receipts for one of the prizes in the dispenser 10, or upon the user inputting multiple printed receipts into the dispenser 10 and utilizing the dispenser 10 to combine the multiple receipts in a single receipt. A touch screen interface 42 is located in the front wall 36 and used to display a number of receipts read by the scanning device 38, the availability of prizes and the value needed to redeem the prizes. The touch screen interface 42 is further used to scroll between and select the prize(s) desired to be dispensed from the cabinet 12. Audio output is delivered through a port 44 aligned with a speaker (not shown) mounted behind the front wall 36.

Although not illustrated, it should be understood that the rotatable carousel 14, the hook assembly 26, the scanning device 38, the printing device 40, the touch screen interface 42 and the speaker feeding port 44 are all operably interconnected with a suitable control arrangement within the cabinet 12. Based on tactile input via the touch screen interface 42, the control arrangement is designed to automatically dispense small prizes from the bin 16 via discharge port 20 and large prizes 28 from the hook assembly 26 via discharge port 34. The control arrangement includes a network connection to provide the ability to monitor the number of prizes in the dispenser 10 such that a report can be generated indicating when the prizes need to be restocked.

Referring now to FIGS. 2-7, the hook assembly 26 is generally comprised of a hook structure 46, a biasing arrangement 48 and an actuator arrangement 50.

The hook structure 46 is defined by at least one, and preferably a plurality of hooks 52, each of which is disposed in one of the slots 30, and retained therein for rocking movement relative to the base 24 by the biasing arrangement 48. As seen best in FIG. 7, each hook 52 is integrally formed with an upper portion 54 that extends above the base 24, and a lower portion 56 which projects beneath the base 24. The upper portion 54 of each hook 52 is configured with an engagement surface 58 and a pair of spaced apart throughholes 60, 62 having axes that lie substantially parallel to a top surface 64 of the base 24. The lower portion 56 of each hook 52 is formed with an inwardly extending recess 66 defined by a wall 68 which is engageable and disengagable with an apertured upper end 70 of prize 28. The outer end of wall 68 terminates in an open end 72 of the hook 52.

Figure 7:
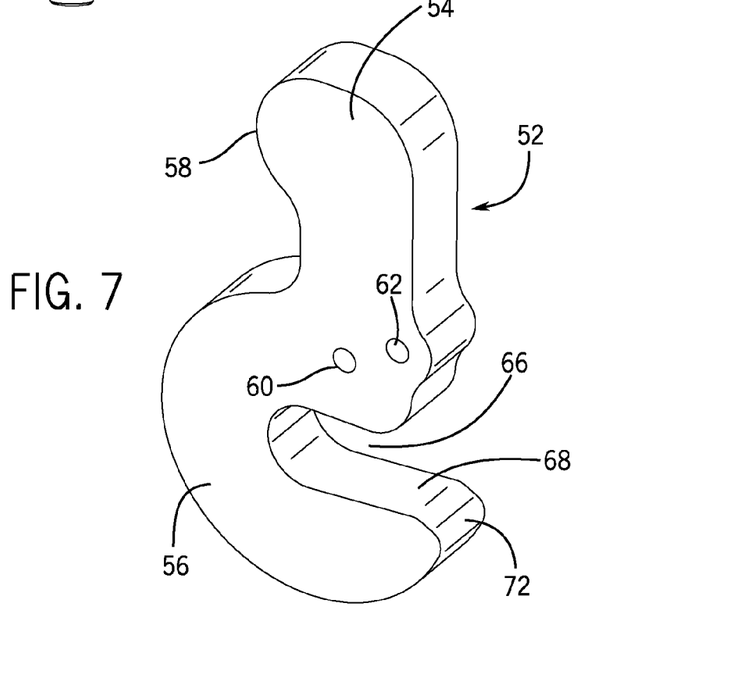
FIG. 7 is an enlarged perspective view of a hook used in the hook assembly.

The biasing arrangement 48 is preferably embodied in, but not limited to, a coil spring having one end engaged in one of the holes 60, 62, such as the hole 62, formed through the hook 52, and an opposite end anchored in the top surface 64 of the base 24. A U-shaped wire guide 74 depends beneath the base 24, and has opposite ends which extend through the slot 30 and are retained against the top surface 64 of the base 24 by suitable fasteners, such as screws 76 and nuts 78. The wire guide 74 is constructed and positioned to receive the lower portion 56 of the hook 52, and to provide a support for the upper end 70 of the prize 28 as will be farther appreciated below. Each hook 52 is provided with a holder 80 that depends from an underside 82 of the base 24 for slidably receiving and retaining a card or the like identifying information such as the location of and redemption value for a particular prize 28 associated with a particular hook 52.

Figure 6:
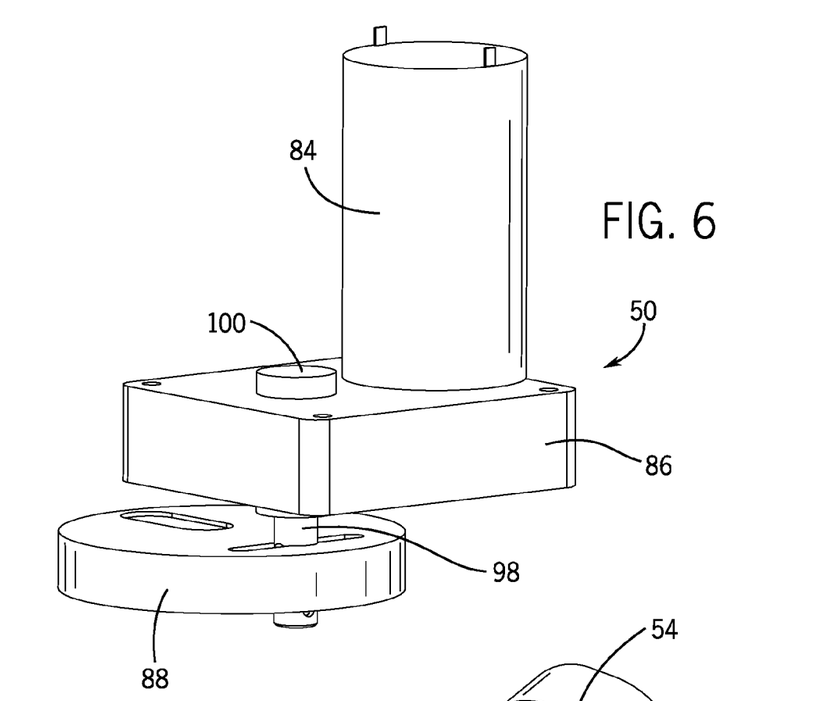
FIG. 6 is a perspective view of an actuator arrangement associated with the hook assembly.

The actuator arrangement 50 includes an actuator 84, a translating device 86 and a movable, disk-like release element 88, and is positioned in alignment with the discharge chute 32 at an interior corner within the cabinet 12 corresponding to the predetermined release location of the dispenser 10. The actuator arrangement 50 is fixedly mounted on a support bracket 90 having a mounting surface 92 fastened to an interior wall 94 of the cabinet 12, and a support surface 96 extending inwardly into the cabinet 12 above the base 24. In the exemplary embodiment, the actuator 84 is a motor having a rotating shaft which extends into driving engagement with a gear arrangement Within the translating device 86. The gear arrangement in turn, operably coupled to a rotatable pin 98 which projects downwardly from the translating device 86, and is fixed eccentrically to the disk-like release element 88. The pin 98 has an enlarged head 100 that rests on top of the translating device 86. A bracket 102 is attached to the translating device 86 for supporting a pair of input receptacles 104, 106 used to receive plugs of suitable wiring for providing electrical power to the actuator 84.

Figure 3:
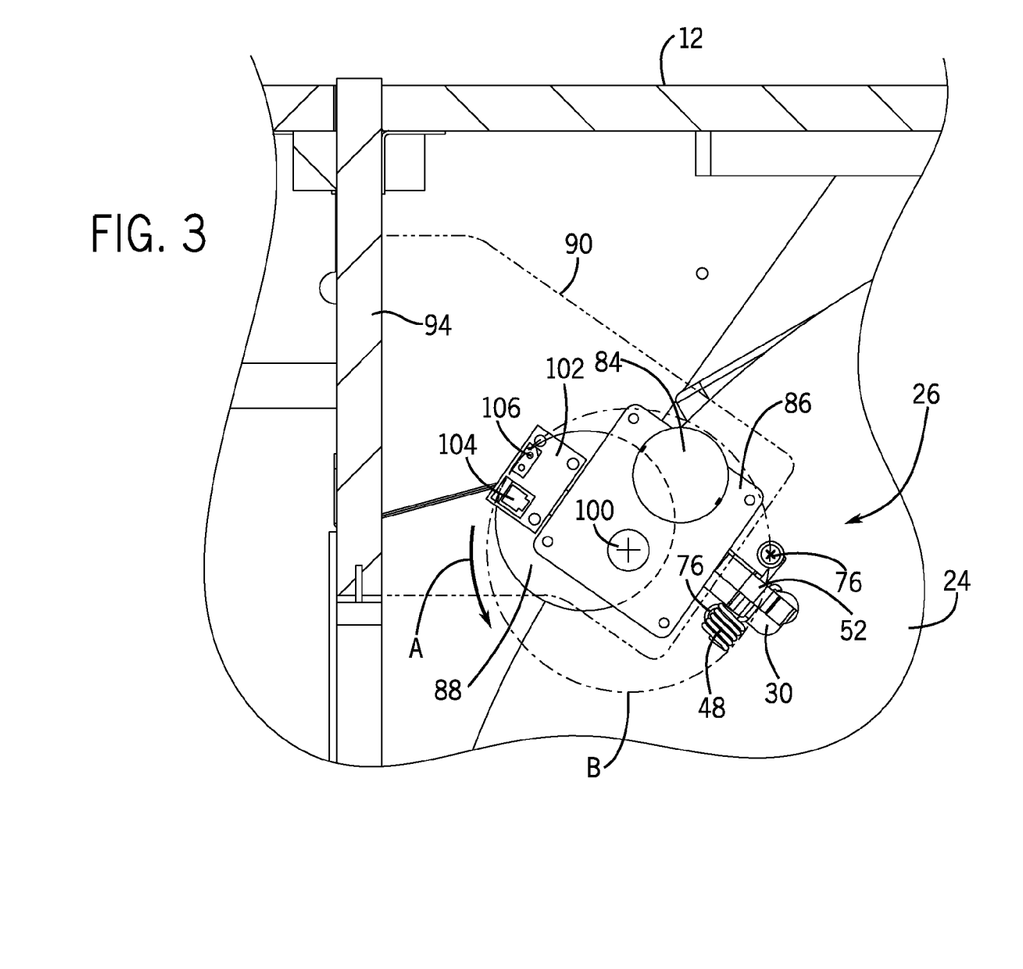
FIG. 3 is a sectional view taken on line 3-3 of FIG. 2.

Selective energization of the actuator 84 by the control arrangement of the dispenser 10 will cause the release element 88 to move from a disengaged position (FIGS. 2-4) with the hook 52 to an engaged position (FIG. 5) with the hook 52. As illustrated in FIG. 3, the release element 88 is designed to rotate in the direction of arrow A so that its outer periphery will move over the base 24 along a path depicted in dotted lines at B towards the hook 52 when the actuator 84 is energized. It should be understood that the actuator 84 and the translating device 86 may be replaced by other suitable alternative devices for enabling selective movement of the release element 88.

Figure 4:
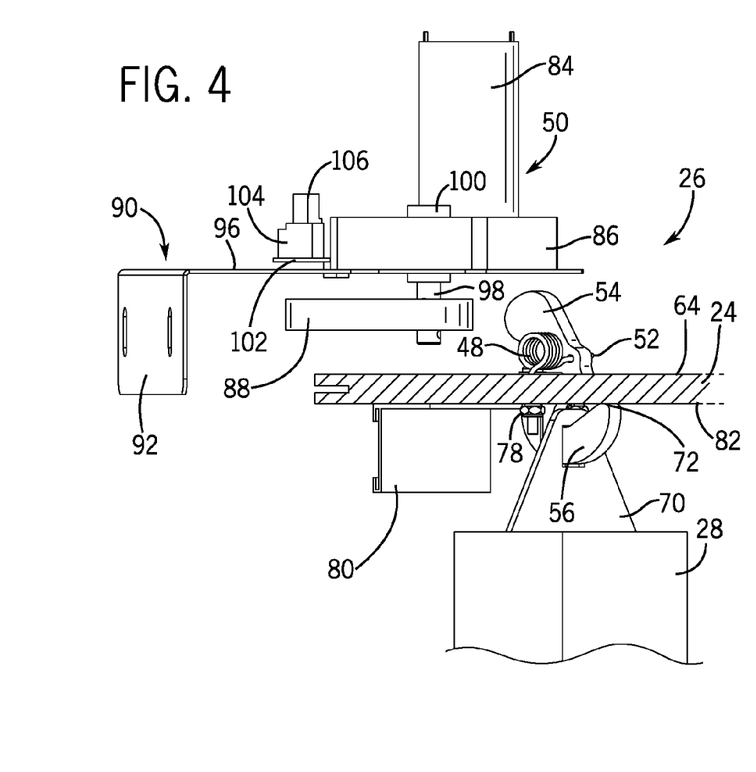
FIG. 4 is a view of the hook assembly in a prize retaining position.
Figure 5:
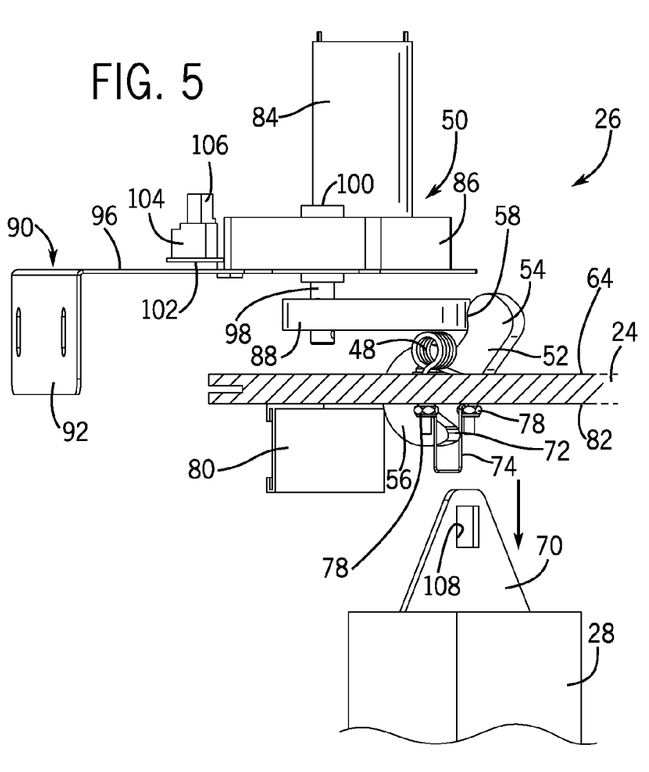
FIG. 5 is a view of the hook assembly in a prize releasing position.

Each hook 52 is movable between a prize retaining position depicted in FIG. 4, and a prize releasing position illustrated in FIG. 5. In the prize retaining position, the spring 48 acts continuously on the hook 52 with a biasing force that normally holds the open end 72 of the hook 52 directly against the underside 82 of the base 24. The upper end 70 of the prize 28 is engaged against the guide 74, and is formed with an aperture 108 having defining walls which are placed in alignment with the guide 74 so that the lower portion 56 of the hook 52 passes through the aligned guide 74 and aperture 108, and the prize 28 is suspended from the Avail 68 of the hook recess 66. In the prize retaining position, the prize 28 is positively prevented from being released from the hook 52 because of the biasing force of the spring 48 continuously engaged between the base 24 and the hook 52, and constantly urging the open end 72 of the hook 52 into a normally closed position in direct engagement against the base 24.

When it is desired to dispense a desired prize suspended from the base 24 in the prize retaining position of FIG. 4, a user makes a prize selection using the touch screen interface 42. This selection causes the control arrangement to rotate the carousel 14 and the base 24 in a clockwise direction so that the hook 52 retaining the desired prize 28 is moved to the predetermined release location adjacent the actuator arrangement 50. At this point, the actuator 84 is energized so that the release element 88 is rotated into selective engagement against the engagement surface 58 of the hook 52 as shown in the prize dispensing position of FIG. 5. The release element 88 is moved with a force that will overcome the biasing force of spring 48 causing the hook 52 to rock and move in the slot 30. This results in the open end 72 of the hook 52 moving away from the underside 88 of base 24, and the lower portion 56 of the hook 52 moving, through the guide 74 so that the prize 28 is released from the hook 52 and dropped downwardly in the direction of arrow B. The released prize 28 falls into the discharge chute 32 and is transferred to the discharge port 34 to be retrieved by the user. Once a dispensing operation has been completed, the release element 88 is moved back to its disengaged position, the spring 48 independently returns the hook 52 to the prize retaining position, and further dispensing operations may proceed.

Various alternatives are contemplated as being within the scope of the following claims particularly pointing out and distinctly claiming the subject matter regarded as the invention.

What is claimed is:

1. A prize dispensing hook assembly for retaining a prize suspended from a base of a prize dispenser and releasing the prize therefrom at a predetermined release location, the hook assembly comprising:
   a hook structure mounted on the base for movement relative thereto, the hook structure being engageable with the prize in a prize retaining position, and being disengagable from the prize in a prize releasing position corresponding to the predetermined release location, wherein the hook structure includes an upper portion extending above the base and a lower portion extending beneath the base and provided with an open end; and
   a biasing arrangement continuously engaged with both the base and the hook structure and providing a biasing force for continuously urging an open end of the hook structure into direct engagement with the base,
   wherein the open end of the hook structure is movable into and out of direct engagement with the base in the prize retaining and prize releasing positions, respectively, and wherein the upper portion of the hook structure is adapted to be selectively engaged by a release element for overcoming the force of the biasing arrangement and moving the hook structure to the prize releasing position.

2. The hook assembly of claim 1, wherein the lower portion of the hook structure is movable through a guide device mounted on the base.

3. The prize dispensing hook assembly of claim 1 wherein the biasing arrangement is defined by a spring.

4. A prize dispenser provided with a hook assembly for retaining a prize suspended therefrom and releasing the prize therefrom at a predetermined release location, the prize dispenser comprising:
   a cabinet;
   a base mounted within the cabinet;
   a hook structure mounted on the base for movement relative thereto, the hook structure being engageable with the prize at a prize retaining position, and disengagable from the prize at a prize releasing position corresponding to the predetermined release location;
   a biasing arrangement continuously engaged with the base and the hook structure and providing a biasing force for continuously urging an open end of the hook structure into direct engagement with the base;
   an actuator arrangement mounted on the cabinet and provided with a movable release element which is selectively engageable with the hook structure to overcome the force of the biasing arrangement, and move the open end of the hook structure away from the base to the prize releasing position such that the prize is disengaged from the hook structure;
   a discharge passage provided in the cabinet in alignment with the predetermined release location for receiving the prize disengaged from the hook structure; and a discharge port provided in the cabinet in communication with the discharge passage for accessing the prize disengaged from the hook structure.

5. The prize dispenser of claim 4, wherein the cabinet is provided with a scanning device for reading receipts redeemable for prizes in the prize dispenser, a printing device for printing a receipt based on input to the scanning device, and a touch screen interface associated with the scanning device for enabling selection of the prizes to be dispensed from the cabinet.

6. The prize dispenser of claim 4, wherein the base is rotatably mounted in the cabinet.

7. The prize dispenser of claim 4, wherein the biasing arrangement is a coil spring having one end attached to the base and another end attached to the hook structure.

8. The prize dispenser of claim 4, wherein the actuator arrangement is mounted on a support bracket attached to an interior wall of the cabinet at the predetermined release location.

9. The prize dispenser of claim 4, wherein the hook structure is movably mounted within a slot arrangement formed in the base.

10. The prize dispenser of claim 4, wherein the hook structure includes an upper portion extending above the base, and a lower portion having an open end extending beneath the base.

11. The prize dispenser of claim 10, wherein the upper portion of the hook structure is engageable with the release element of the actuator arrangement.

12. The prize dispenser of claim 10, wherein the open end of the hook structure is normally held closed and engaged directly against the base in the prize retaining position.

13. The prize dispenser of claim 10, wherein the lower portion of the hook structure is formed with a recess having a wall for supporting the prize in the prize retaining position.

14. The prize dispenser of claim 7, wherein the release element is movable directly against the hook structure to overcome the biasing force of the coil spring on the hook structure so that the prize is disengaged from the hook structure, after which the coil spring returns the hook structure to the prize retaining position.

15. The prize dispenser of claim 4, wherein the release element is selectively rotatable over the base into engagement with the hook structure at the predetermined release location.

* * * * *